(12) United States Patent
Shirpour et al.

(10) Patent No.: US 11,271,210 B2
(45) Date of Patent: Mar. 8, 2022

(54) CATHODE ACTIVE MATERIAL WITH SILICON CARBIDE ADDITIVE

(71) Applicant: Apple Inc., Cupertino, CA (US)

(72) Inventors: Mona Shirpour, Sunnyvale, CA (US); Tetsuya Ishikawa, San Jose, CA (US); Sally S. Lou, San Jose, CA (US); Juchuan Li, San Jose, CA (US); Shawn William Snyder, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 211 days.

(21) Appl. No.: 16/703,178

(22) Filed: Dec. 4, 2019

(65) Prior Publication Data

US 2021/0175506 A1    Jun. 10, 2021

(51) Int. Cl.
| | |
|---|---|
| *H01M 4/136* | (2010.01) |
| *H01M 4/525* | (2010.01) |
| *H01M 4/58* | (2010.01) |
| *H01M 10/0525* | (2010.01) |
| *H01M 4/62* | (2006.01) |
| *H01M 4/131* | (2010.01) |
| *H01M 4/02* | (2006.01) |

(52) U.S. Cl.
CPC .......... *H01M 4/624* (2013.01); *H01M 4/131* (2013.01); *H01M 4/136* (2013.01); *H01M 4/525* (2013.01); *H01M 4/5825* (2013.01); *H01M 10/0525* (2013.01); *H01M 2004/028* (2013.01)

(58) Field of Classification Search
CPC ....... H01M 10/0525; H01M 2004/028; H01M 4/131; H01M 4/136; H01M 4/364; H01M 4/525; H01M 4/5825; H01M 4/624
See application file for complete search history.

(56) References Cited

U.S. PATENT DOCUMENTS

| | | | |
|---|---|---|---|
| 10,305,100 B2 | 5/2019 | Kim et al. | |
| 10,461,320 B1 | 10/2019 | Xue et al. | |
| 2012/0326079 A1* | 12/2012 | Kim ...................... | H01M 4/364 252/182.1 |

FOREIGN PATENT DOCUMENTS

| | | |
|---|---|---|
| CN | 103545516 A | 1/2014 |
| CN | 109494361 A | 3/2019 |
| EP | 2538473 A1 | 12/2012 |
| KR | 20150050152 A | 5/2015 |
| KR | 20190038395 A | 4/2019 |

OTHER PUBLICATIONS

International Search Report and Written Opinion dated Jan. 14, 2021 in Intl. Application No. PCT/US2020/054382 (13 pp).

(Continued)

*Primary Examiner* — Carlos Barcena
(74) *Attorney, Agent, or Firm* — Young Basile Hanlon & MacFarlane, P.C.

(57) ABSTRACT

A lithium battery cathode material comprises lithium transition metal-based material selected from lithium transition metal oxides and lithium transition metal phosphates, and crystalline silicon carbide residing at grain boundaries of the lithium transition metal-based material, forming conductive pathways along the grain boundaries, the crystalline silicon carbide being less than 10 wt. % of the cathode material.

18 Claims, 5 Drawing Sheets

(56) References Cited

OTHER PUBLICATIONS

Xu, Q., et al., "First-Principles Study of Lithium Borocarbide as a Cathode Material for Rechargeable Li ion Batteries", The Journal of Physical Chemistry Letters, dx.doi.org/10.1021/jz200440m, J. Phys. Chem. Lett. 2011, 2, 1129-1132 (4 pp).
Bazito, F., et al., "Cathodes for Lithium Ion Batteries: The Benefits of Using Nanostructured Materials", J. Braz. Chem. Soc., vol. 17, No. 4, 627-642, 2006 (16 pp).

* cited by examiner

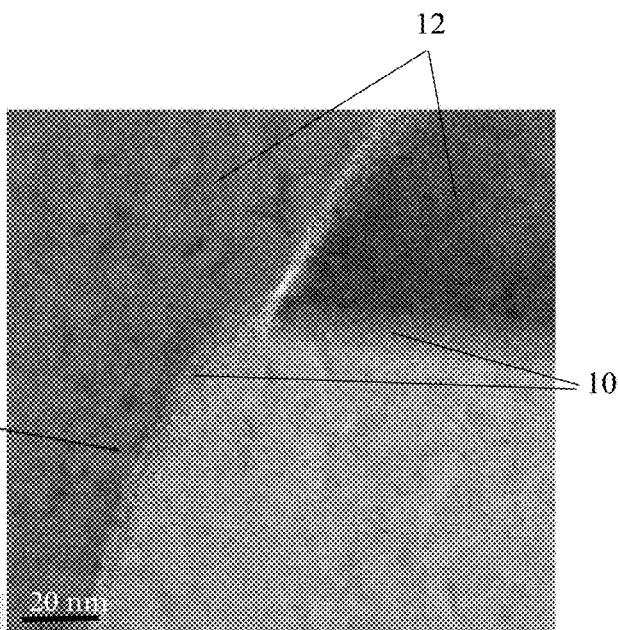
FIG. 1C
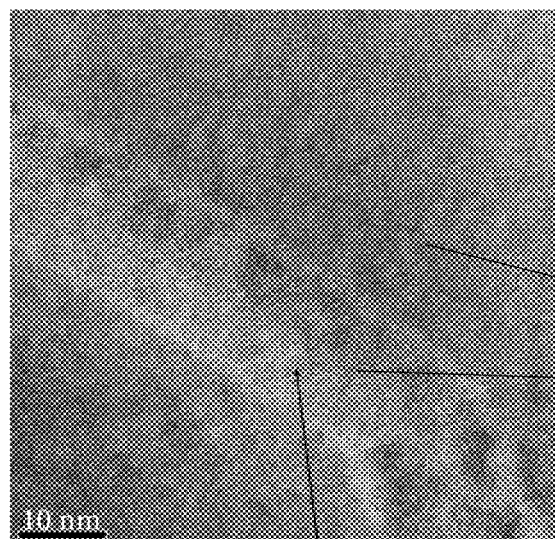
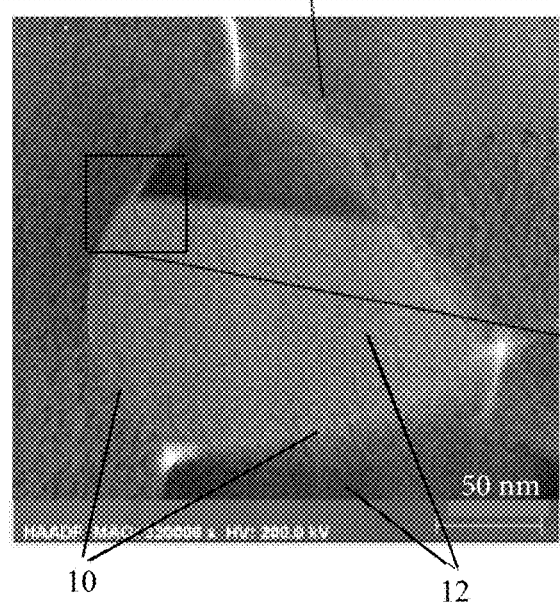
FIG. 1A        FIG. 1B

CATHODE ACTIVE MATERIAL WITH SILICON CARBIDE ADDITIVE

TECHNICAL FIELD

This disclosure relates to cathode active material for lithium batteries, the cathode active material including a silicon carbide additive.

BACKGROUND

Lithium batteries employ cathode active materials to release and store cations during charge and discharge operations, respectively. Such cathode active materials can include transition metal oxides and phosphates, which are commonly used to exchange lithium cations with an electrolyte. Transition metal oxides and phosphates with superior performance as cathode active materials are, however, increasingly reaching their performance limits. Increasing cathode thickness is one of the most effective methods to enable the development of lithium batteries with improved energy density. Thick cathodes are found to increase cell polarization and underutilization of active materials. The former is affected by electronic conductivity and the latter is affected by lithium ion diffusion in active materials. Therefore, it is still necessary to develop cathode materials that satisfy requirements for thick (5-50 um for solid electrolyte) and ultra-thick (>150 um for liquid electrolyte) cathodes simultaneously enabling high-energy density and high-rate capability.

SUMMARY

Disclosed herein are implementations of a cathode material for a lithium battery, comprising lithium transition metal-based particles selected from lithium transition metal oxides and lithium transition metal phosphates, and silicon carbide particles residing at grain boundaries of the lithium transition metal-based particles, forming conductive pathways along the grain boundaries.

The silicon carbide particles may each have a longest dimension of less than 100 nm.

The silicon carbide particles may be less than 10 wt. % of the cathode material.

The silicon carbide particles may be less than 1 wt. % of the cathode material.

The silicon carbide particles may an aspect ratio of 1 to 25.

The silicon carbide particles may be nanofiber particles.

The nanofiber particles of silicon carbide may have an aspect ratio of between 5 and 25, inclusive.

The cathode material disclosed herein may have a pore volume of 0-50%.

Also disclosed herein are lithium batteries comprising the cathode material disclosed herein. The lithium battery may be a lithium metal battery having one or more lithium metal battery cell. The lithium battery may be a lithium ion battery having one or more lithium ion battery cells.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features may be arbitrarily expanded or reduced for clarity.

FIG. 1A is a high-resolution TEM image showing the bulk grains of LCO and the crystalline grain boundaries containing silicon carbide between the bulk grains.

FIG. 1B is an enlarged image of a section of FIG. 1A.

FIG. 1C is an enlarged image of another section of FIG. 1A.

DETAILED DESCRIPTION

Figures 2A, 2B:
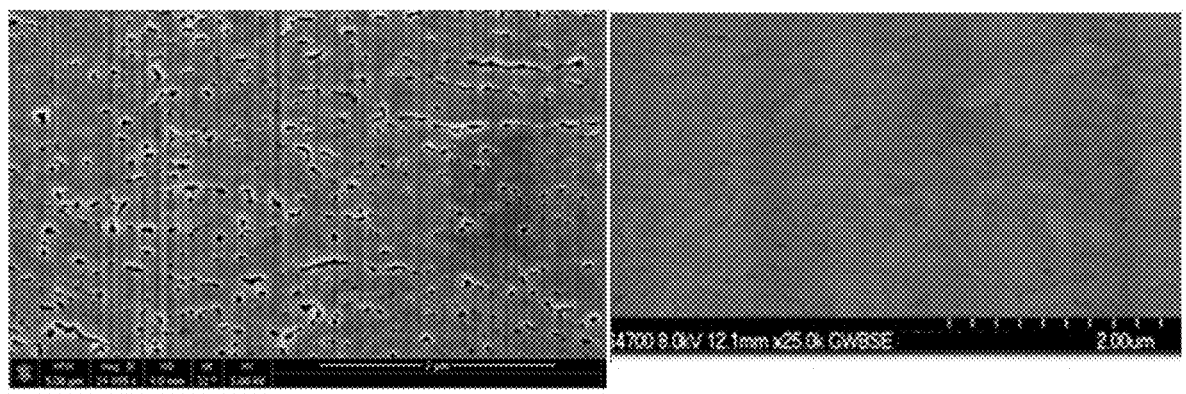
FIG. 2A is a high-resolution SEM image of LCO cathode material after thermal treatment.
FIG. 2B is a high-resolution SEM image of LCO and 0.5 wt % SiC as disclosed herein after thermal treatment.

Electrochemically active cathode materials in pure form (for instance commercially available LiCoO$_2$), may not provide a sufficiently high lithium ion diffusion and electronic conductivity. Improved cathode performance for both pure cathodes and composite cathodes requires, in part, a high, effective diffusion coefficient inside the cathode. Mass and charge transports inside the cathode allow for, upon cell discharge, as many electrochemically active species (ions and electrons) as possible to be inserted into the cathode in the shortest time possible and into cathode locations that are farthest away from the cathode-electrolyte interface. Fast ionic grain boundary conduction can be effective in providing ions to and from the locations of the electrochemical reactions responsible for capacity and energy storage, which are inside the grain bulk. The cathode material for lithium batteries disclosed herein improves the ion and electron diffusion within the cathode by providing a silicon carbide additive that provides paths around and between the bulk grains of the cathode active material.

Small grain sizes of the active cathode material are conducive to shortening the migration paths of lithium ions and electrons during the lithiation/delithiation process and as a result, improve the electrochemical performances. The lithium battery cathode material disclosed herein includes a silicon carbide additive which inhibits grain growth and provides a very dense cathode microstructure.

The lithium battery cathode material disclosed herein comprises lithium transition metal-based material selected from lithium transition metal oxides and lithium transition metal phosphates, and crystalline silicon carbide residing at grain boundaries of the lithium transition metal-based material, forming conductive pathways along the grain boundaries.

The lithium transition metal-based material may be an intercalation lithium ion compound such as lithium transition metal oxides having a general formula of LiMO$_2$ and LiM$_x$O$_y$, and lithium transition metal phosphates, having the general formula of LiMPO$_4$, wherein M is one or more transitional metal cations. The lithium transition metal-based material can include, as non-limiting examples, layered-type materials, such as LiCoO$_2$, LiN$_{1/3}$Mn$_{1/3}$Co$_{1/3}$O$_2$ and $LiNi_{0.8}Co_{0.15}Al_{0.05}O_2$; olivine-type materials, such as $LiFePO_4$; spinel-type materials, such as $LiMn_2O_4$; and other similar materials.

The crystalline silicon carbide resides at grain boundaries of the lithium transition metal-based material, forming conductive pathways along the grain boundaries. This can be seen in FIGS. 1A-1C, which use $LiCoO_2$ (LCO) as the lithium transition metal-based material and include 0.5 wt % silicon carbide, the material annealed at 800° C. FIG. 1A is a high-resolution TEM image showing crystalline silicon carbide 10 along the grain boundaries between the bulk LCO 12. The silicon carbide resides at the grain boundaries and surrounds the grains at a nanometer level. FIGS. 1B and 1C are enlarged images of the section of FIG. 1A indicated in the figures with the arrows. The silicon carbide conductive pathways have a width between bulk particles of about 20 nm or less, 10 nm or less, and may be 5 nm or less.

The silicon carbide is mixed with the lithium transition metal-based material or their precursors and processed to form the cathode film. The silicon carbide does not decompose and become incorporated into the active material even after high temperature thermal treatment, as evidenced by FIGS. 1A-1C. The crystalline silicon carbide sits between the bulk grains of the lithium transition metal-based material after annealing of the cathode material, surrounding the grains of the lithium transition metal-based material and providing conductive pathways through the cathode material.

The silicon carbide promotes densification of the cathode material without significant grain growth, which often occurs during high temperature densification. It has been found that thermal treatment as low as 700° C. can result in the very dense microstructure. FIGS. 2A and 2B are high-resolution SEM images of LCO without the silicon carbide and LCO with 0.5 wt % silicon carbide, respectively. The pure LCO in FIG. 2A was annealed at 850° C. while the LCO with the silicon carbide was annealed at 800° C. The density of LCO with the SiC additive is >95% of the theoretical density while LCO with no additive is <90% of the theoretical density, and LCO grains are 500 nm or smaller with the SiC additive while the LCO grains are greater than 2000 nm without the SiC additive.

The silicon carbide particles in the disclosed cathode material can be any particle shape having a longest dimension of less than 100 nm. The silicon carbide particles can be spherical or filament or fiber-shaped, with an aspect ratio (L/D) of 1 to 25. In some embodiments, the silicon carbide particles are nano-fibers having an aspect ratio of between 5 and 25, inclusive.

Silicon carbide is not electrochemically active, so the amount used should be sufficient to provide the nano-scale conductive pathways around the bulk active material. The silicon carbide may be less than 10 wt. % of the cathode material. In some embodiment, the silicon carbide may be less than 1 wt. % of the cathode material.

Figure 3A:
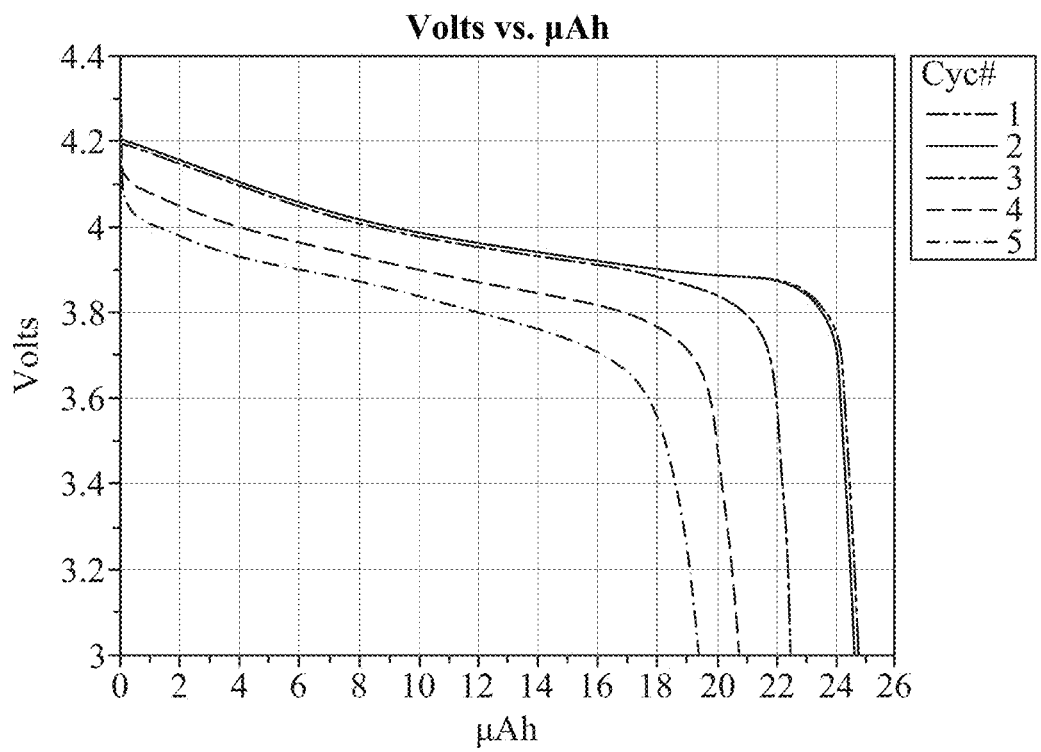
FIG. 3A is a discharge curve of a lithium battery cell using LCO cathode material.
Figure 3B:
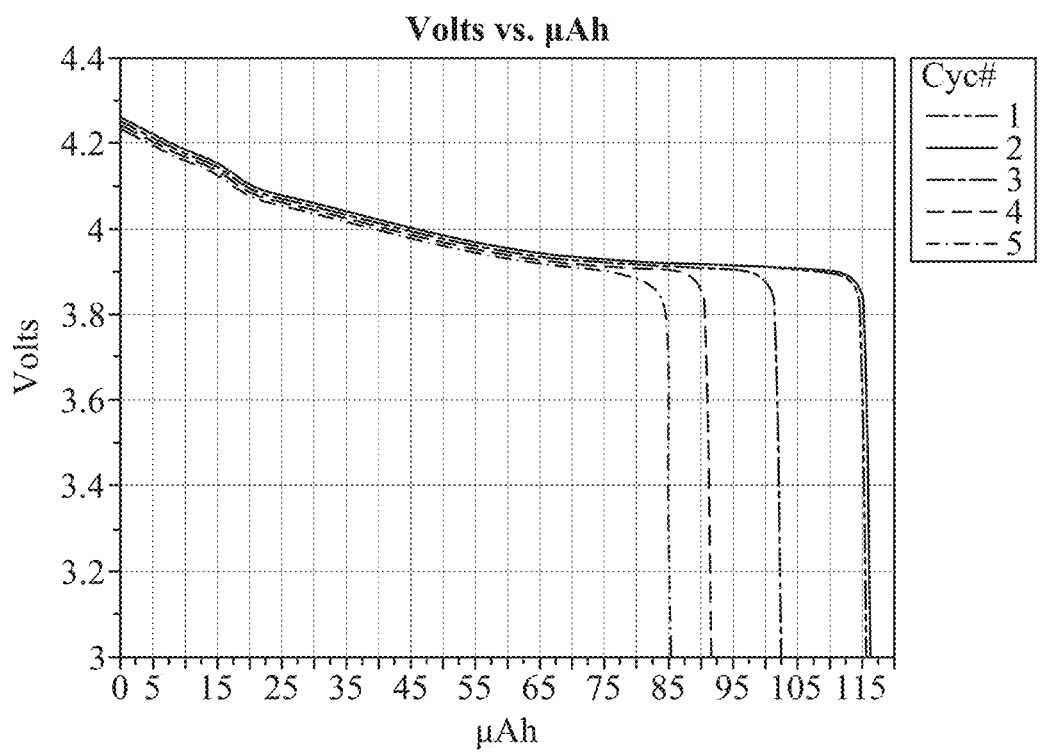
FIG. 3B is a discharge curve of a lithium battery cell using LCO and 1.0 wt % SiC as the cathode material.

Lithium batteries using the cathode material disclosed herein realize better rate performance and improved diffusion characteristics. FIG. 3A is a discharge curve for a battery cell formed with a 10 μm thick wafer of LCO while FIG. 3B is a discharge curve for a battery cell formed with a 10 μm thick wafer of LCO and 1 wt % SiC. The mixture of LCO and SiC was deposited by dry spraying on a solid electrolyte or substrate. The as-deposited film was then annealed at elevated temperatures. The cathode film was then cycled at 0.2C (cycle 1 and 2), 0.5C (cycle 3), 1C (cycle 4) and 2C (cycle 5) against metallic lithium. The flatter discharge curves and the minimal voltage drop at different discharge rates illustrated in FIG. 3B indicates enhanced electronic and ionic conductivities in the cell using the cathode material disclosed herein.

The cathode material disclosed herein can be used with all-solid-state batteries, which have all solid components. The cathode material disclosed herein can also be used in lithium-ion batteries having a non-metallic lithium anode with either a liquid or a solid electrolyte, and lithium-metal batteries with a liquid, solid or gel electrolyte.

A lithium battery may be prepared according to the following method. As a non-limiting example, the cathode may be prepared using the cathode material disclosed herein. A cathode current collector with a cathode active layer formed thereon may be prepared by directly coating, using dry spraying and deposition such as PVD and CVD, as non-limiting examples, the cathode active material composition on a cathode current collector, which can be an aluminum sheet or foil, for example. The cathode active layer may also be cast on a separate support to form a film, and then a cathode may be prepared by detaching the film from the support and laminating the detached film on the cathode current collector.

An anode may be prepared with an anode active material, and optionally a binder and/or solvent. The binder may be any suitable binder, e.g., one or more of vinylidene fluoride/hexafluoropropylene copolymer, polyvinylidene fluoride, polyacrylonitrile, poly(methyl methacrylate), polytetrafluoroethylene (PTFE), and styrene butadiene rubber-based polymer. The solvent may be any suitable solvent, e.g., one or more of N-methylpyrrolidone (NMP), acetone, and water.

Example anode active materials include elemental materials, such as lithium; alloys including alloys of Si, Sn, Al, Ge, Pb, Bi, and Sb or other lithium compounds; and intercalation host materials, such as a carbon-based material. The carbon-based material may include one or more of crystalline carbon and amorphous carbon. The crystalline carbon may include one or more graphites, such as, e.g., shapeless, plate, flake, spherical, or fibrous graphite, where the graphite may be natural or artificial graphite. The amorphous carbon may include one or more of soft carbon (e.g., low-temperature fired carbon), hard carbon, mesophase pitch carbide, and fired coke. An anode may be prepared by sputtering or evaporation of a metallic anode, as examples, to form the anode active material composition on an anode current collector, which can be copper sheet or foil, for example. An anode may also be prepared by casting the anode active material composition on a separate support to form a film, and then detaching the film from the separate support and laminating the detached film to the anode current collector.

A separator, if used, may be inserted between the cathode and the anode. The separator is not particularly limited and any separator may be used. A separator having high moisture-retention ability for an electrolyte and/or a low resistance to the transfer of electrolyte ions may be used. The separator may include, e.g., one or more of glass fibers, polyester, Teflon, polyethylene, polypropylene, and polytetrafluoroethylene (PTFE). The separator may be a nonwoven or woven fabric type. The electrolyte is not particularly limited, and the electrolyte may be a liquid electrolyte, a gel and/or a solid. As examples, the liquid electrolyte may be in the form of a solution in which a lithium salt is dissolved in an organic solvent. The gel electrolyte may be in the form of a gel in which the above mentioned liquid electrolyte is impregnated into a matrix polymer composed of an ion conductive polymer.

Figure 4:
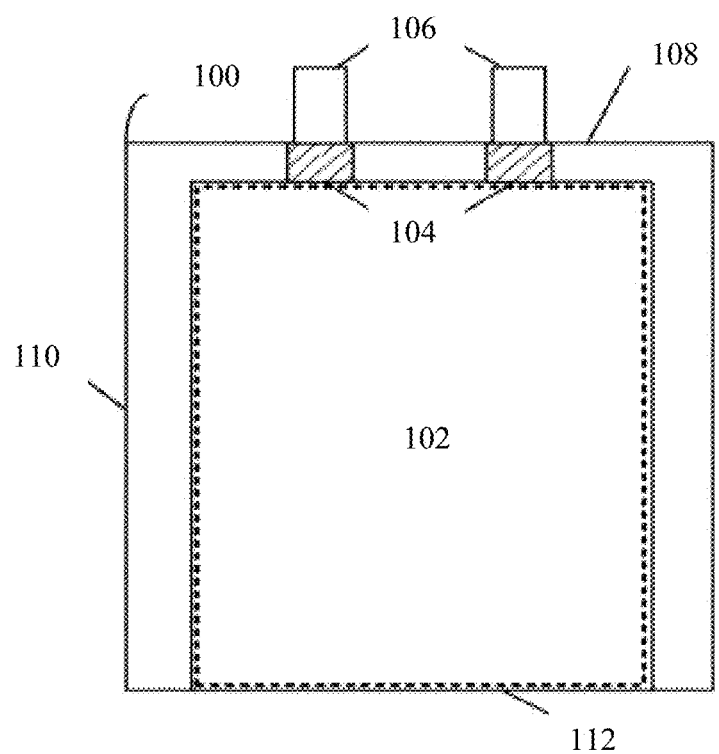
FIG. 4 is a plan view of a lithium battery cell in accordance with an embodiment.

FIG. 4 illustrates a plan view of a lithium battery cell 100 in accordance with an embodiment. The lithium battery cell 100 includes a stack 102 containing a number of layers that include a cathode, a separator, an electrolyte and an anode. The layers may be left flat in a planar configuration or may be wrapped into a wound configuration (e.g., a "jelly roll"), although other configurations are possible. The flexible pouch is formed by folding a flexible sheet along a fold line 112. For example, the flexible sheet may be made of aluminum with a polymer film, such as polypropylene. After the flexible sheet is folded, the flexible sheet can be sealed, for example, by applying heat along a side seal 110 and along a terrace seal 108. The stack 102 also includes a set of conductive tabs 106 coupled to the cathode and the anode. The conductive tabs 106 may extend through seals in the pouch to provide terminals for the battery cell 100. The conductive tabs 106 may then be used to electrically couple the battery cell 100 with one or more other battery cells to form a battery pack. Lithium batteries can be combined in a battery pack in any configuration. For example, the battery pack may be formed by coupling the battery cells in a series, parallel, or a series-and-parallel configuration.

Figure 5:
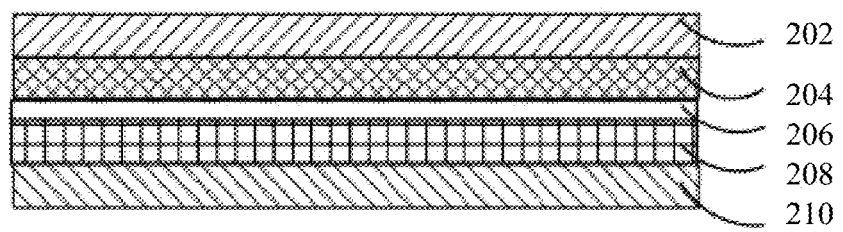
FIG. 5 is a schematic of a side view of the layers for the lithium battery cell of FIG. 4.

FIG. 5 is a schematic of a side view of the layers for the lithium battery cell 100 of FIG. 1. The layers may include a cathode current collector 202, a cathode active coating 204, a separator 206, an anode active coating 208, and an anode current collector 210. The cathode current collector 202 and the cathode active coating 204 may form the cathode for the lithium battery cell, and the anode current collector 210 and the anode active coating 208 may form the anode for the lithium battery cell.

Figure 6A:
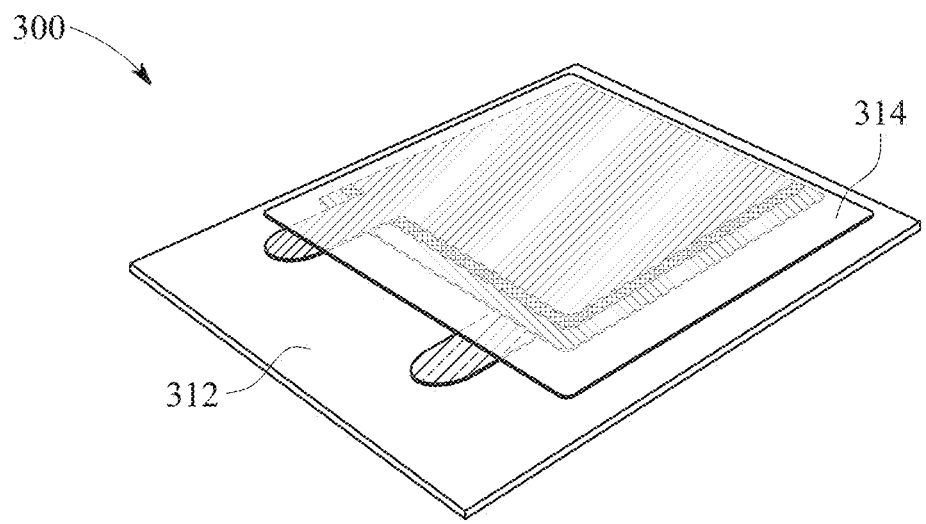
FIG. 6A is a perspective view of a solid-state battery cell in accordance with an embodiment.
Figure 6B:
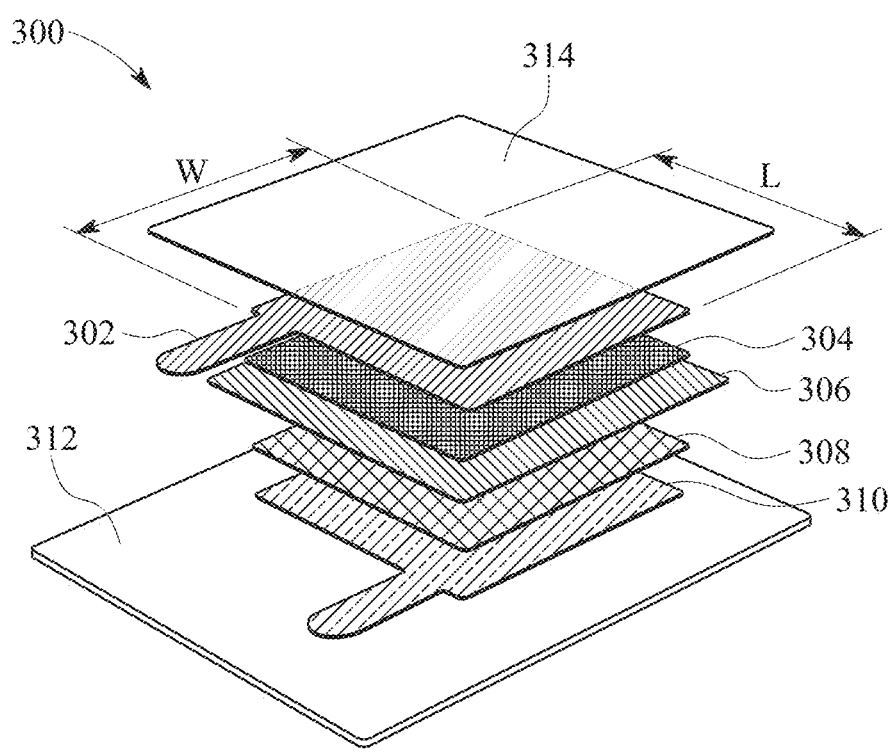
FIG. 6B is an exploded view of the solid-state battery cell of FIG. 6A.

FIG. 6A is a perspective view of an example of a solid-state lithium battery 300 and FIG. 6B is an exploded view of the layers of the solid-state lithium battery 300. The solid-state lithium battery 300 has an anode current collector 302, an anode 304, a solid electrolyte 306, a cathode 308, a cathode current collector 310 and an optional substrate 312. The layers can be sequentially deposited as thin layers on a substrate 312. The layers are encapsulated with an encapsulation material 314. Alternatively, the cathode 308 and/or cathode current collector 310 may have sufficient mechanical strength to support the layers such that the substrate 312 is not required. The cathode 308 is the cathode material disclosed herein. The anode material can be lithium metal or can be other materials listed above. The solid electrolyte can be, as non-limiting examples, sulfide compounds (e.g. Argyrodite, LGPS, LPS, etc.), garnet structure oxides (e.g. LLZO with various dopants), NASICON-type phosphate glass ceramics (LAGP), oxynitrides (e.g. lithium phosphorus oxynitride or LIPON), and polymers (PEO).

Unless defined otherwise, all technical and scientific terms used herein have the same meanings as commonly understood by one of ordinary skill in the art to which this disclosure belongs. Preferred methods, techniques, devices and materials are described although any methods, techniques, devices, or materials similar or equivalent to those described may be used in the practice or testing of the present disclosure. Structures described herein are to be understood also to refer to functional equivalents of such structures.

It must be noted that as used herein and in the appended claims, the singular forms "a," "an," and "the" include the plural reference unless the context clearly dictates otherwise. Thus, for example, a reference to "an element" is a reference to one or more elements, and includes equivalents thereof known to those skilled in the art.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A cathode material for a lithium battery, comprising:
lithium transition metal-based particles selected from lithium transition metal oxides and lithium transition metal phosphates; and
silicon carbide residing at grain boundaries of the lithium transition metal-based particles, forming conductive pathways along the grain boundaries, wherein the silicon carbide is not decomposed and does not incorporate with the lithium transition metal-based particles.

2. The cathode material of claim 1, wherein silicon carbide particles each have a longest dimension of less than 100 nm.

3. The cathode material of claim 1, wherein the silicon carbide is less than 10 wt. % of the cathode material.

4. The cathode material of claim 1, wherein the silicon carbide is less than 1 wt. % of the cathode material.

5. The cathode material of claim 1, wherein silicon carbide particles have an aspect ratio of 1 to 25.

6. The cathode material of claim 1, wherein the silicon carbide is nanofiber particles.

7. The cathode material of claim 6, wherein the nanofiber particles have an aspect ratio of between 5 and 25, inclusive.

8. The cathode material of claim 1, having a density of >95% of theoretical density of $LiCoO_2$ and grains smaller than 500 nm after thermal treatment at temperatures greater than or equal to 800° C.

9. A lithium metal battery cell, comprising:
a cathode comprising the cathode material of claim 1;
an anode comprising a lithium compound; and
an electrolyte.

10. The lithium metal battery cell of claim 9, wherein the cell is an all-solid-state cell.

11. A lithium-ion battery cell, comprising:
a cathode comprising the cathode material of claim 1;
an anode comprising one or more of a metal and a metalloid alloyable with lithium, an alloy thereof, or an oxide thereof, and a carbon material; and
one or more of a liquid electrolyte, a gel electrolyte and a polymer electrolyte.

12. A lithium battery cathode material, comprising:
lithium transition metal-based material selected from lithium transition metal oxides and lithium transition metal phosphates; and
crystalline silicon carbide residing only at grain boundaries of the lithium transition metal-based material, forming conductive pathways along the grain boundaries, the crystalline silicon carbide being less than 10 wt. % of the cathode material.

13. The lithium battery cathode material of claim 12, wherein the crystalline silicon carbide is 1 wt. % or less of the cathode material.

14. The lithium battery cathode material of claim 12, wherein the crystalline silicon carbide is in nanofiber form.

15. The lithium battery cathode material of claim 12, wherein the crystalline silicon carbide material has a longest dimension of less than 100 nm.

16. The lithium battery cathode material of claim 12, wherein the crystalline silicon carbide material has an aspect ratio of 1 to 25.

17. The lithium battery cathode material of claim 12, having a density of >95% of theoretical density of $LiCoO_2$ and grains smaller than 500 nm after thermal treatment at a temperature of 800° C. or greater.

18. A cathode material for a lithium battery, comprising:
- lithium transition metal-based particles selected from lithium transition metal oxides and lithium transition metal phosphates; and
- silicon carbide residing at grain boundaries of the lithium transition metal-based particles, forming conductive pathways along the grain boundaries, wherein the silicon carbide is nanofiber particles having an aspect ratio of between 5 and 25, inclusive.

\* \* \* \* \*